US005974674A

United States Patent [19]

Kelly

[11] Patent Number: 5,974,674

[45] Date of Patent: Nov. 2, 1999

[54] UNDERCUT SAW

[76] Inventor: Daniel E. Kelly, 31327 Emperor Dr., Canyon Lake, Calif. 92562

[21] Appl. No.: 09/109,317

[22] Filed: Jul. 1, 1998

[51] Int. Cl.$^6$ .............................................. B23D 45/16

[52] U.S. Cl. .............................. 30/391; 30/390; 30/276; 144/136.95; 144/371

[58] Field of Search .............................. 30/276, 388, 390, 30/391, 373; 451/455, 352, 353, 344, 451, 454, 358; 144/136.95, 154.5, 371

[56] References Cited

U.S. PATENT DOCUMENTS

| | | | |
|---|---|---|---|
| 1,806,582 | 5/1931 | Beutner | 30/390 |
| 2,610,658 | 9/1952 | Koeling | 30/373 |
| 2,741,282 | 4/1956 | Wieting | 144/136.95 |
| 3,111,969 | 11/1963 | Bivens | 30/373 |
| 3,177,909 | 4/1965 | Laube et al. | 30/391 |
| 3,613,748 | 10/1971 | De Pue | 30/373 |
| 3,805,639 | 4/1974 | Peter | 30/391 |
| 5,012,582 | 5/1991 | Bristol et al. | 30/391 |
| 5,531,147 | 7/1996 | Serban | 30/391 |
| 5,542,183 | 8/1996 | Allison | 30/391 |
| 5,637,035 | 6/1997 | Yee | 451/455 |
| 5,784,789 | 7/1998 | Vargas . | |

OTHER PUBLICATIONS

“Instruction Manual for Crain No. 800 Super Saw” published by Crain Cutter Col, Inc. of Mipitas, California; pre May 1997.

“Makita Disc Grinder 100 mm (4") model N9514B Instruction Manual” pubished by Makita Corporation of America, Buford, Georgia; pre May 1997.

“Talon Owner’s Operating Manual Angle Grinder Model 8303, 8313” published by Jenn Feng U.S.A of Lincolnshire, Ilinois; pre May 1997.

*Primary Examiner*—Hwei-Siu Payer
*Attorney, Agent, or Firm*—Loyal McKinley Hanson

[57] ABSTRACT

A saw assembly for a floor installer to use in undercutting baseboards, doors, and the like includes an electric motor subassembly having an electric motor and a spindle rotatably powered by the electric motor, a circular blade mounted on the spindle, and a blade guard subassembly. The blade guard assembly includes a moveable component adapted for movement to a retracted position that exposes more than 180 degrees of the circumference of the circular blade in order to facilitate the undercutting of a ninety degree inside corner. One embodiment uses a conventional handheld 11,000 rpm high speed grinder motor assembly with a right angle drive to power a high speed 4-inch blade in place of a grinder wheel. Carrying the undercut saw with a grinder wheel, sanding wheel, and a tile cutting blade adds functionality.

4 Claims, 3 Drawing Sheets

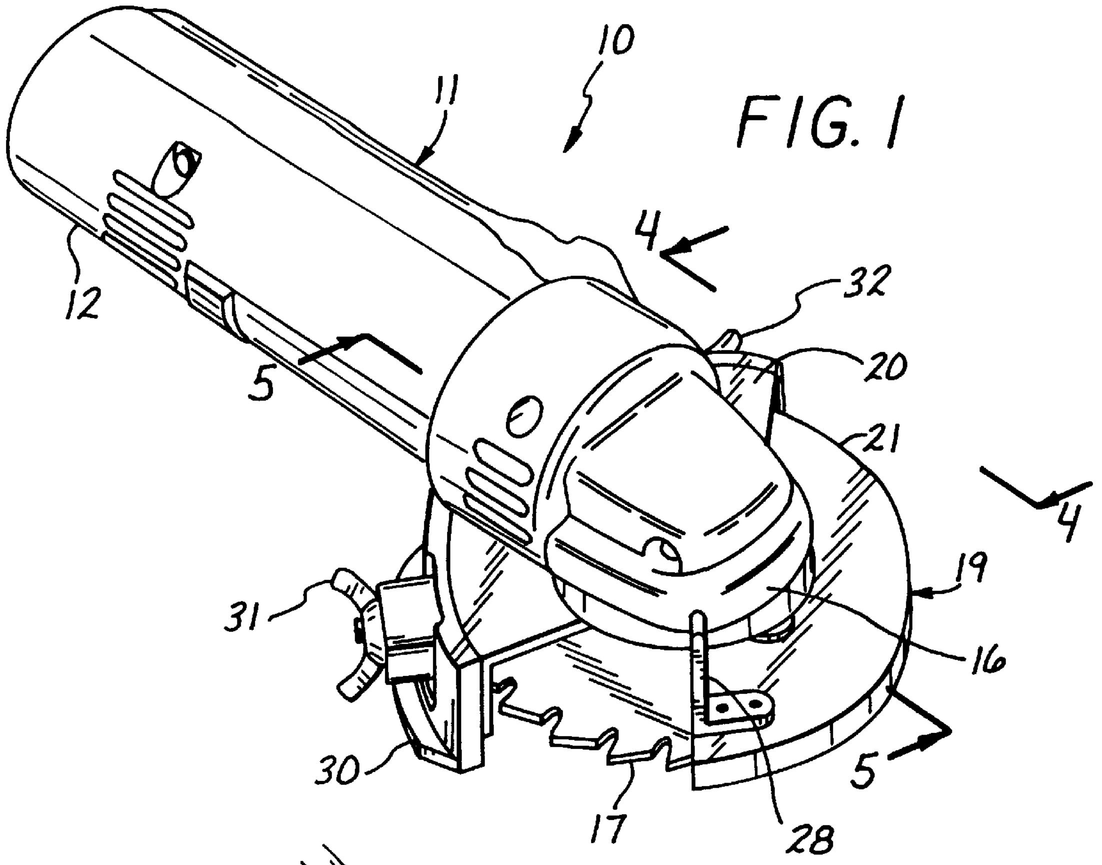
FIG. 1
FIG. 2
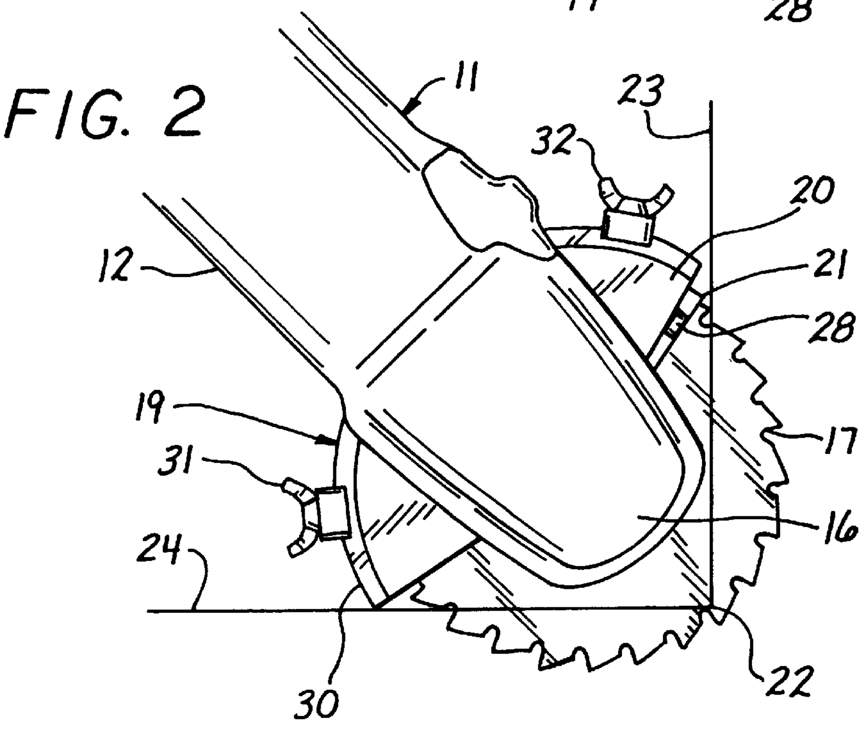

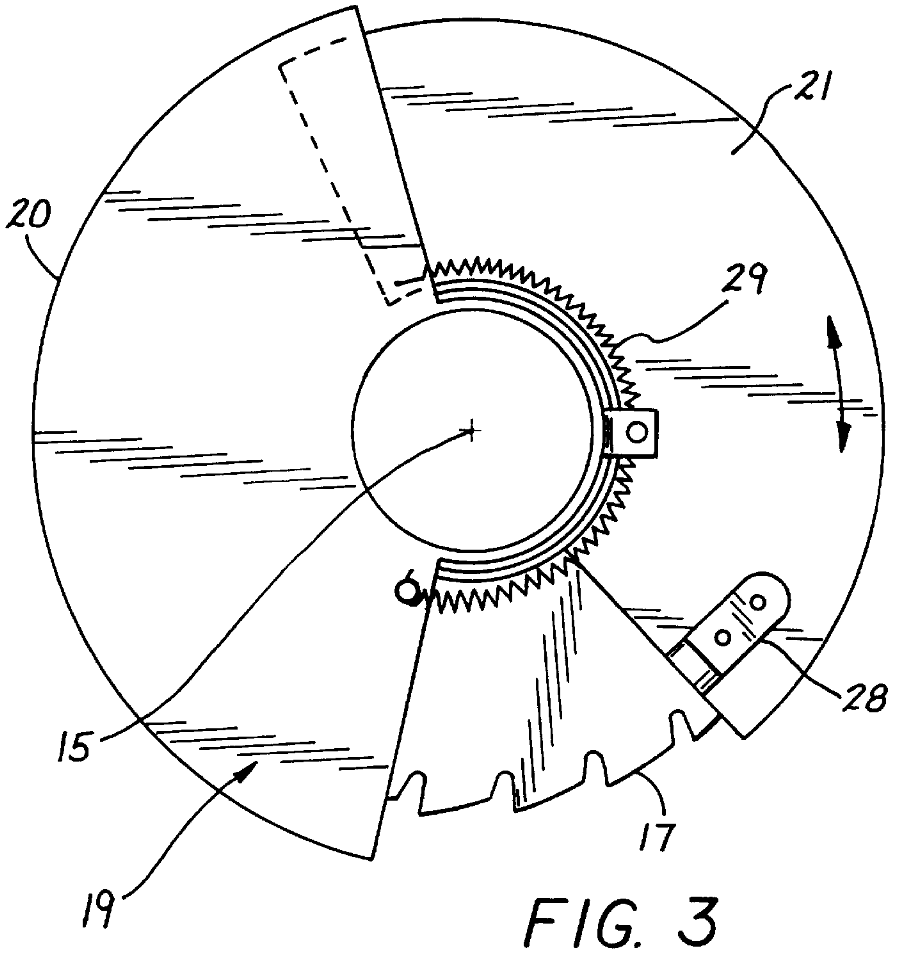
FIG. 3
FIG. 4
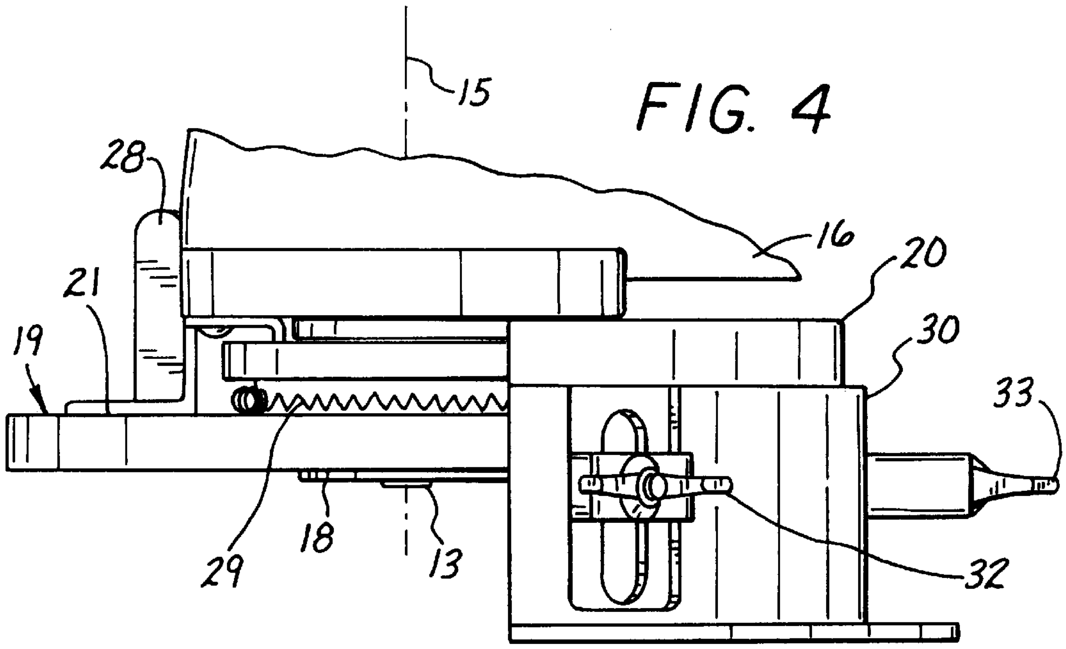

UNDERCUT SAW

BACKGROUND OF THE INVENTION

1. Technical Field

This invention relates generally to power tools, and more particularly to a portable, multifunction, electrically powered undercut saw.

2. Description of Related Art

To install tile, wood, marble, granite, and other floor coverings, an installer often must undercut the baseboards and doors about 0.25 inch to 1.75 inches. He does so to provide sufficient space for the floor covering to fit underneath for a clean, professional installation. The tool he uses is referred to as a flush-cutting saw or undercut saw.

An existing undercut saw may take the form of the saw available under the trademark CRAIN No. 800 SUPER SAW from Crain Cutter Co., Inc. of Milpitas, Calif. It includes a flat socket set screw for mounting a 6.5-inch diameter blade on a 2⅓ horsepower, 5300 rpm electric motor. With a blade guard, height adjuster, depth gauge, and associated components, the total assembly appears something like a skill saw on its side, weighs in at about 9.0 pounds, with the blade guard and depth gauge limiting blade exposure to something less than 180 degrees.

To use the existing undercut saw, the installer mounts the blade. Next, he adjusts the height adjuster for a desired height above the floor and the depth gauge to a desired depth of cut. Then, he grasps the saw with two hands, retracts the blade guard to expose the blade, and proceeds to move the undercut saw along the floor adjacent the baseboard while switching the power on and off to make the desire undercuts.

But there are some problems. The saw is relatively heavy, big, bulky, and somewhat expensive. In addition, the 6.5 inch blade tends to get very hot and warp. Furthermore, the 6.5 inch blade and bulk of the unit makes undercutting an inside ninety-degree corner somewhat awkward because the depth gauge abuts the wall either side of the corner before the corner can be undercut. The 6.5-inch diameter blade cannot reach the corner.

The depth gauge is an adjustable flat fence type of structure that extends along a chord of the blade in order to expose up to about 1¾ inches of the blade measured radially, perpendicular to the fence. In that position, the depth gauge subtends an arc of less than 180 degrees and it gets in the way. It abuts the wall before the corner is undercut. Even if the depth gauge is omitted, the size of the 6.5-inch diameter blade results in a cut greater than one-inch deep a few inches either side of the corner in order to make just a quarter inch deep cut right at the corner. Thus, floor covering installers and other users need an improved undercut saw.

SUMMARY OF THE INVENTION

This invention addresses the problems outlined above by providing an undercut saw assembly that omits the depth gauge, uses a smaller blade, and includes an improved blade guard in a configuration that significantly facilitates undercutting, especially inside corners. A preferred embodiment utilizes a high speed 4-inch blade mounted on a small, 11,000 rpm, right angle drive electric motor (e.g., a 4-inch portable grinder motor). The unit fits conveniently in a tool box, and keeping a grinder wheel, sanding wheel, and diamond tip saw blade on hand adds multifunctionality.

To paraphrase some of the more precise language appearing in the claims, a saw assembly constructed according to the invention includes an electric motor subassembly, a circular blade, and a blade guard. The electric motor subassembly includes an electric motor and a spindle rotatably powered by the electric motor. The circular blade is mounted on the spindle, and the blade guard is mounted on the electric drive motor subassembly to cover at least a portion of the blade circumference.

According to one aspect of the invention, the blade guard includes a moveable component adapted for movement by a user to a retracted position that exposes more than 180 degrees of the circumference of the circular blade (preferably 190–200 degrees). According to another aspect, the circular blade has a diameter of less than five inches. According to yet another aspect, the electric motor subassembly takes the form of a conventional high speed grinder motor assembly with a right angle drive, and a four inch blade is used in place of a grinder wheel.

The resulting undercut saw is lighter, smaller, less bulky, and less expensive. The right angle drive makes it easier to manipulate, like a portable disc grinder. The smaller blade overheats less. Blade size combines with the blade guard configuration and the omission of an obstructing fence-like depth gauge to facilitate undercutting inside corners. Carrying the undercut saw with a grinder wheel, sanding wheel, and a tile cutting blade adds functionality. The following illustrative drawings and detailed description make the foregoing and other objects, features, and advantages of the invention more apparent.

BRIEF DESCRIPTION OF THE DRAWINGS

FIG. 1 of the drawings is a top, front, and left side perspective view of an undercut saw assembly constructed according to the invention;

FIG. 2 is a top view of a front portion of the undercut saw assembly undercutting a ninety-degree inside corner;

FIG. 3 is an enlarged top view of the blade and the blade guard;

FIG. 4 is an enlarged right side view of the front portion taken on line 4—4 of FIG. 1;

DESCRIPTION OF A PREFERRED EMBODIMENT

Figure 6:
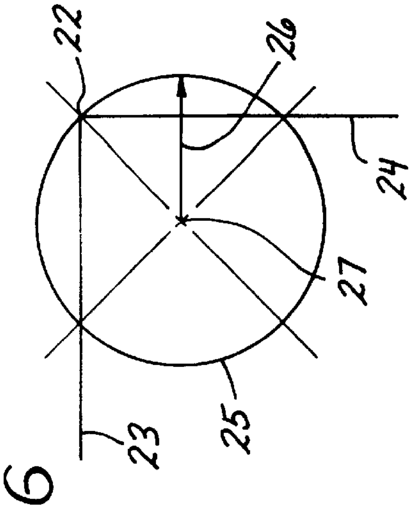
FIG. 6 is a diagrammatic view showing the geometric relationship between a circular blade of radius R and a ninety degree inside corner.

FIGS. 1–6 of the drawings show various details of an undercut saw assembly 10 constructed according to the invention. Generally, the saw assembly 10 includes an electric motor subassembly 11 (FIGS. 1, 2, and 5) having an electric motor 12 and a spindle 13 (FIGS. 4 and 5) rotatably powered by the electric motor 12. Those components can take any of various forms, including the electric motor subassembly of the 4-inch, right angle drive grinder model 8313 that is commercially available under the trademark TALON from Jenn Feng U.S.A. of Lincolnshire, Ill. That electric motor assembly weighs about five pounds and measures roughly 2½ inches in outside diameter and about ten inches long so that it can be conveniently grasped with one hand. Details of construction of it and other suitable electric motor subassembly are available from any of various manufacturers.

In the illustrated embodiment, the electric motor 12 is a high speed motor operating on 120-volt, 60-Hz, 700-watts of power at 7,000 rpm or more (e.g., a no load speed of 11,000 rpm). It is adapted to produce rotational movement about a first axis of rotation 14 (FIG. 5) and the spindle 13 is rotatably powered by the electric motor 12 for rotation about a second axis of rotation 15 (FIGS. 3–5) that is perpendicular to the first axis of rotation 14. For that purpose, the electric motor subassembly 11 includes a right angle drive 16 (FIGS. 1, 2, 4, and 5) that couples rotational movement by suitable known means from the electric motor 12 to the spindle 13.

Figure 5:
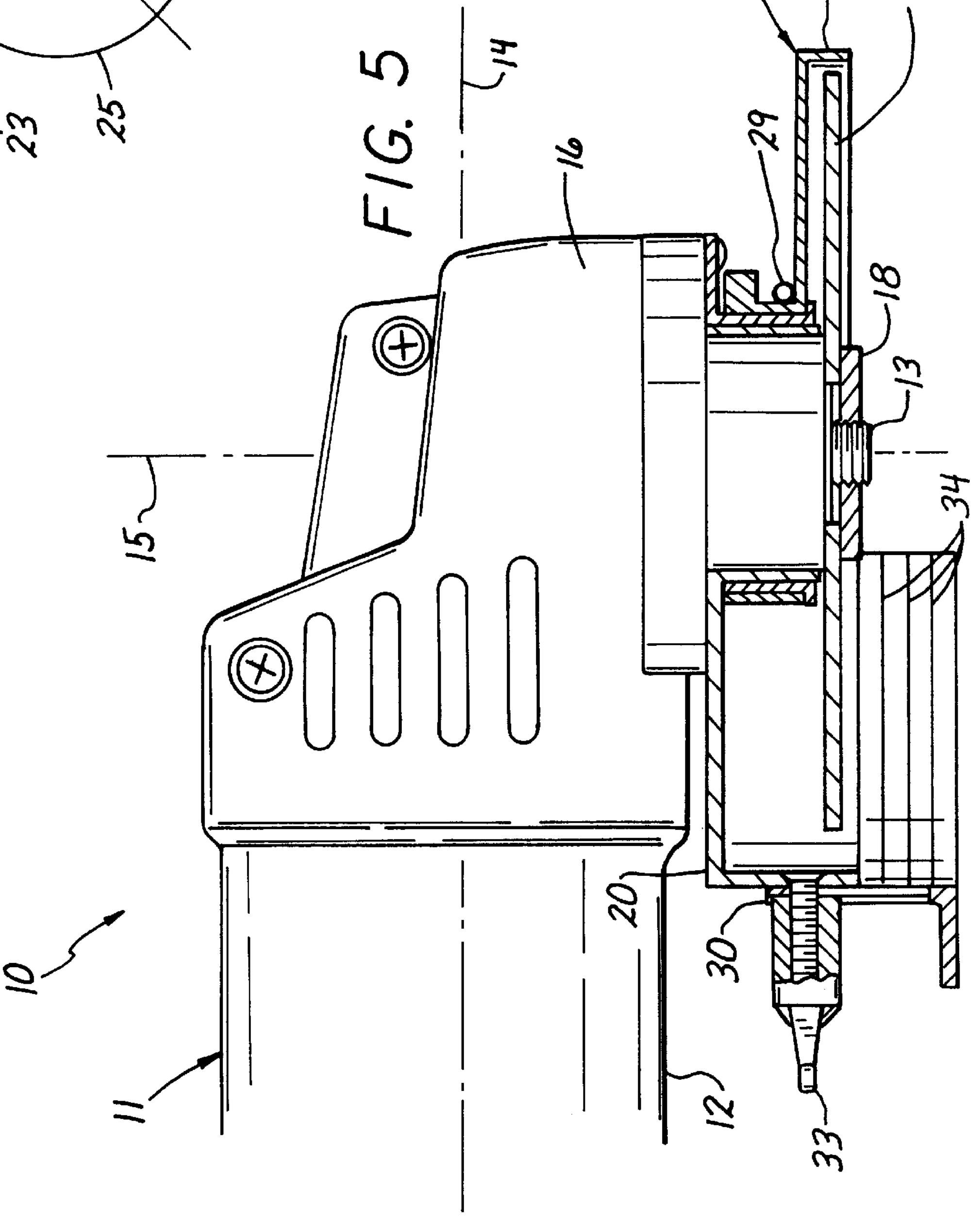
FIG. 5 is an enlarged left side view taken on line 5—5 of FIG. 1 with portions in cross section.

A circular blade 17 (FIGS. 1–3 and 5) is removably mounted on the spindle 13 with a 3⁄16 inch thick by 1.5-inch diameter threaded clamp nut 18 that can be seen in FIGS. 4 and 5 that screws onto the spindle 13 (or other suitable locking arrangement), and a blade guard subassembly 19 (FIGS. 1–5) is mounted on the electric motor subassembly 11 where it covers much of the blade 17 for safety purposes. The illustrated blade 17 is a conventional, high speed 4-inch blade having teeth that extend radially at their outermost extremities to a maximum 4.25-inch diameter of the blade 17. The blade guard subassembly 19 includes a fixed component 20 and a moveable component 21 that cover the blade 17 (FIGS. 1–5) so that there is about 3⁄16 inch clearance between the blade 17 and the moveable component 21.

According to one aspect of the invention, the moveable component 21 is adapted for movement by a user to a retracted position of the moveable component 21 that exposes more than 180 degrees of the outer circumference of the circular blade 17 (e.g., about 190–200 degrees). The retracted position is shown in FIG. 2, while a closed position (a position in which the moveable component 21 at least partially covers the otherwise exposed circumference) is shown in FIGS. 1 and 3. The moveable component 21 is adapted to pivot about the second axis of rotational 15 as depicted by the double headed arrow in FIG. 3, between the closed and retracted positions. By exposing more than 180 degrees, it facilitates undercutting an inside corner 22 at the intersection of first and second wall surfaces 23 and 24 as illustrated by the top view in FIG. 2. The blade 17 is able to undercut the corner 22 sufficiently as shown in FIG. 2 (0.25–0.75 inch), even though the moveable component 21 of the blade guard subassembly 19 abuts the first wall surface 23 and the fixed component 20 abuts the second wall surface 24. And, with no prior art fence type of depth gauge to abut the wall surfaces 23 and 24, this aspect of the invention significantly facilitates undercutting.

According to another aspect of the invention, the blade diameter is significantly less than the 6.5-inch diameter of blades used with some existing undercut saws. The smaller diameter blade (e.g., less than 5 inches in diameter) also facilitates undercutting. Some of the geometric relationships associated with this aspect of the invention are illustrated diagrammatically in FIG. 6, where the circle 25 depicts the outer circumference of a blade of known size (e.g., the blade 17) in a position where the outer circumference just touches the corner 22 without undercutting it. A radius 26 of the circle 25 extends from the center 27 of the circle 25 perpendicular to and under the wall surface 24. Applying the Pythagorean theorem and well known geometric and trigonometric techniques reveals that the radius 26 extends beyond the wall surface 24 a distance equal to 0.293 times the length of the radius 26. In other words, a 6.5-inch diameter blade undercuts the wall surface 24 about 0.95 inch at the position of the radius 26, compared to about 0.62 inch for a 4.25-inch diameter blade, and that is before the blade 17 even begins to undercut the corner 22 at the intersection of the wall surfaces 23 and 24. Thus, a smaller blade diameter (a smaller radius) permits undercutting the corner 22 without having to undercut so much at the position of the radius 26 (and so much at a corresponding position of a radius perpendicular to the wall surface 23).

Based upon the foregoing and subsequent descriptions, one of ordinary skill in the art can readily fabricated an undercut saw as described and claimed. The illustrated blade guard subassembly 19, however, is fabricated from an aluminum alloy, and the fixed component 20 is screwed or otherwise suitably attached to the right angle drive 16 so that it covers the rearwardly disposed 160 degrees or so of the blade 17. For the illustrated embodiment, an embodiment that uses an existing grinder electric motor assembly, the fixed component 20 takes the place of the grinder wheel cover it replaces. It mounts with screws in threaded holes originally provided for a cover or guard over the grinder wheel.

The moveable component 21 is mounted on the fixed component 20 in a suitable manner so that a user can rotate the fixed component 21 about the second axis of rotation 15 between the open and closed positions of the moveable component 21. One of ordinary skill in the art can devise any of various suitable mechanical arrangements that function that way. An upstanding handle 28 is provided (FIGS. 1–4) that the user can grasp for that purpose, and a spring 29 (FIGS. 3, 4, and 5) is provided that spring biases the moveable component 21 toward the closed position shown in FIG. 3.

A height gauge assembly 30 (FIGS. 1, 2, 4, and 5) is attached to the fixed component 20 with three quarter-inch diameter, 5⁄8-inch long bolt-and-wingnut assemblies 31, 32, and 33 (FIGS. 1, 2, 4, and 5) that the user looses to adjust the height of the undercut made by the blade 17. Spaced apart grooves 34 in the height gauge assembly 30 at 1⁄8-inch intervals (FIG. 5) designate predetermined heights.

Thus, the invention provides an undercut saw that omits the depth gauge, uses a smaller blade, and includes an improved blade guard in a configuration that significantly facilitates undercutting, especially inside corners. A preferred embodiment utilizes a high speed 4-inch blade mounted on a small, 11,000 rpm, right angle drive electric motor subassembly of a commercially available 4-inch portable grinder. The resulting undercut saw is lighter, smaller, less bulky, and less expensive. The right angle drive makes it easier to manipulate, like a portable disc grinder. The smaller blade overheats less. Blade size combines with the blade guard configuration and the omission of an obstructing fence-like depth gauge to facilitate undercutting inside corners. The unit fits conveniently in a tool box, and keeping a grinder wheel, sanding wheel, and a diamond tip saw blade on hand adds multifunctionality. Although an exemplary embodiment has been shown and described, one of ordinary skill in the art may make many changes, modifications, and substitutions without necessarily departing from the spirit and scope of the invention.

What is claimed is:

1. A saw assembly, comprising:

an electric motor subassembly, the electric motor subassembly having an electric motor adapted to produce rotational movement about a first axis of rotation and a spindle rotatably powered by the electric motor for rotation about a second axis of rotation that is perpendicular to the first axis of rotation;

a circular blade mounted on the spindle, the blade having teeth that extend to an outer circumference of the circular blade; and a blade guard subassembly mounted on the electric motor subassembly, the blade guard subassembly including a fixed component intersecting a plane formed by said first and second axes of rotation and a movable component that combine operatively to provide a protective cover over at least a portion of the circumference of the circular blade, and said movable component adapted for movement by a user to a retracted position of the movable component that exposes more than 180° of the outer circumference of the circular blade.

2. A saw assembly as recited in claim 1, wherein the electric motor is adapted to operate at rotational speeds greater than 7,000 revolutions per minute.

3. A saw assembly as recited in claim 1, wherein the outer diameter of the circular blade is less than five inches.

4. A saw assembly as recited in claim 1, wherein the moveable component of the blade guard subassembly is adapted for movement by a user to a retracted position of the moveable component that exposes at least 190 degrees of the circumference of the circular blade.

* * * * *